United States Patent Office 2,951,065
Patented Aug. 30, 1960

2,951,065

2-TRIFLUOROMETHYL-BUTADIENE COPOLYMERS AND PREPARATION THEREOF

Elizabeth S. Lo, Elizabeth, N.J., and George H. Crawford, Jr., Staten Island, N.Y., assignors, by mesne assignments, to Minnesota Mining and Manufacturing Company, St. Paul, Minn., a corporation of Delaware No Drawing. Filed Oct. 28, 1955, Ser. No. 543,581

16 Claims. (Cl. 260—87.7)

This invention relates to new fluorine-containing polymers and to a method for the preparation thereof. In one aspect this invention relates to new fluorine-containing elastomeric copolymers having improved properties. In another aspect this invention relates to a method for the manufacture of new fluorine-containing elastomers having improved properties.

Fluorine-containing polymers, and especially the highly fluorinated thermoplastics such as polytetrafluoroethylene and polytrifluorochloroethylene homopolymers, are known to possess many useful applications by virtue of their chemical inertness and high physical strength. Because of these properties such fluorine-containing polymers can be fabricated into a wide variety of useful articles having improved chemical and physical stability. It is also desirable, however, to produce a fluorine-containing elastomeric composition having the aforementioned characteristics and which retains its rubbery characteristics over a wide range of temperatures, and especially at temperatures as low as $-60°$ F. In addition such an elastomer should be readily vulcanized and selectively soluble in relatively volatile organic solvents and vehicles.

It is, therefore, an object of this invention to provide new and useful fluorine-containing polymers having desirable chemical and physical characteristics.

Another object is to provide new and useful fluorine-containing elastomeric polymers which are readily fabricated into a wide variety of useful articles, and which have particularly good retention of flexibility and rubbery characteristics at temperatures as low as $-60°$ F.

Another object is to provide new elastomeric high polymers which are soluble in relatively volatile organic solvents, and which are easily applied as protective coatings to metal and fabric surfaces.

Still another object of this invention is to provide a method for the preparation of elastomeric compositions having the aforementioned characteristics.

Various other objects and advantages of the present invention will become apparent to those skilled in the art from the accompanying description and disclosure.

Accordingly, the above objects are accomplished by the process which comprises polymerizing 2-trifluoromethyl-butadiene with an ethylenically mono-unsaturated hydrocarbon in which one or more hydrogen atoms is substituted only with a corresponding number of fluorine atoms, in the presence of a polymerization promoter. The polymerization reaction of the present invention is carried out at temperatures between about $-15°$ C. and about $150°$ C. and preferably at a temperature between about $15°$ C. and about $75°$ C. The preferred polymerization catalyst system is an aqueous system comprising a peroxy compound and an emulsifier. The copolymers thus obtained are valuable macromolecules having particularly good low temperature flexibility, elasticity, and resilience. In addition, these new compositions are chemically and thermally stable, selectively soluble in various organic solvents and can be molded by conventional techniques to yield a wide variety of useful end products, and are also useful as durable, flexible, protective coatings on surfaces which are subject to environmental conditions in which they may come into contact with temperatures as low as $-60°$ F. and strong chemical reagents.

As indicated above, 2-trifluoromethyl-butadiene is copolymerized with a fluorine-substituted ethylenically monounsaturated hydrocarbon. Such monoolefins are substituted only with fluorine substituents and are referred to herein as the fluoromonoolefins. The preferred comonomers have not more than 6 carbon atoms per molecule and have at least one carbon atom bearing two fluorine substituents. Of this preferred class, the fluoromonoolefins having at least one fluorine atom for every carbon atom, that is, at least as many fluorine substituents as there are carbon atoms, are particularly preferred. Examples of suitable comonomers which are polymerized with 2-trifluoromethyl-butadiene in accordance with the present invention are vinylidene fluoride, trifluoroethylene, tetrafluoroethylene, 3,3,3-trifluoropropene, 2,3,3,3-tetrafluoropropene, 1,1,3,3,3-pentafluoropropene, hexafluoropropene, hexafluoroisobutene and 1,1,1-trifluoro-3-trifluoromethyl-butene-2.

In order to obtain copolymers of 2-trifluoromethyl-butadiene having a good combination of the above-mentioned desirable characteristics, at least 10 mol percent of 2-trifluoromethyl-butadiene is incorporated into the copolymer product. A copolymer containing less than 10 mol percent of 2-trifluoromethyl-butadiene, and correspondingly more than about 90 mol percent of the fluoro-monoolefin, does not exhibit appreciably improved low temperature flexibility. The most useful copolymers produced in accordance with this invention are the elastomers containing between about 10 mol percent and about 95 mol percent of combined 2-trifluoromethyl-butadiene, the remaining major constituent being any one of the above-mentioned fluoro-monoolefins. Of these copolymers those containing between about 40 and about 90 mol percent of 2-trifluoromethyl-butadiene are particularly preferred.

In order to obtain the copolymers containing between about 10 and about 95 mol percent of combined 2-trifluoromethyl-butadiene, an initial monomer charge containing between about 5 and about 90 mol percent of 2-trifluoromethyl-butadiene and between about 95 and about 10 mol percent of the aforesaid comonomers is employed. An initial monomer charge containing between about 25 and about 80 mol percent of 2-trifluoromethyl-butadiene, and correspondingly between about 75 and 20 mol percent of the fluoro-monoolefin, leads to the production of the particularly preferred copolymers of the present invention, i.e., those containing between about 40 and about 90 mol percent of combined 2-trifluoromethyl-butadiene.

The fluorine-containing polymers of the present invention are prepared in various comonomer ratios at temperatures between about $-15°$ C. and about $150°$ C. in the presence of a free radical forming initiator or an ionic initiator as the polymerization promoter. The preferred temperature is dependent upon the type of polymerization catalyst system employed as will be discussed in more detail hereinafter. The free radical forming initiators or promoters comprise the organic peroxides and azo compounds, and inorganic peroxy compounds. The ionic initiators comprise the inorganic halides of the Friedel-Crafts catalyst type and mineral acids. The initiator is generally employed in an amount between about 0.001 and about 5 parts by weight per 100 parts of total monomers employed and preferably are employed in an amount of between about 0.01 and about 1.0 part by weight. The polymerization catalyst systems may be aqueous or non-aqueous and include the aqueous suspension and aqueous emulsion systems, and the mass and solution systems, the aqueous emulsion system being preferred. The copolymerization reaction may also be initiated or catalyzed by actinic or ultraviolet radiation without departing from the scope of this invention.

The aqueous catalyst systems comprise water and a peroxy compound, i.e. a compound containing an —O—O— linkage, as the promoter or initiator. Emulsifiers, activators, accelerators, buffers and bases may also be included as ingredients of the aqueous systems. The different types of aqueous emulsion systems are conveniently differentiated on the basis of the promoter employed to initiate the polymerization reaction.

One type of aqueous emulsion system is that in which an organic peroxide, which is preferably a water soluble peroxide, is employed as the initiator, and a second type is that in which an inorganic peroxy compound is employed as the initiator. Exemplary of the organic peroxides or oxidants which are particularly preferred as the initiators in an aqueous emulsion system are cumene hydroperoxide, diisopropyl benzene hydroperoxide, triisopropyl benzene hydroperoxide, tertiary-butyl hydroperoxide, tertiary-butyl perbenzoate and methyl cyclohexane hydroperoxide.

The inorganic peroxy compounds employed as the initiator in the aqueous polymerization systems are preferably the water soluble inorganic peroxy compounds such as the perborates, persulfates, perphosphates, percarbonates, barium peroxide, zinc peroxide and hydrogen peroxide. Particularly effective inorganic peroxides are the water soluble salts of the peracids such as the sodium, potassium, calcium, barium and ammonium salts of the persulfuric and perphosphoric acids such as potassium persulfate and sodium perphosphate.

Activators which are often used in conjunction with the peroxy compound comprise sodium bisulfite, sodium metabisulfite, sodium thiosulfate, sodium hydrosulfate, p-toluene sulfinic acid, a reducing sugar such as dextrose and levulose and, in general, any water soluble reducing agent. Such activators are generally employed in an amount between about 0.2 and about 0.8 part by weight per 100 parts of total monomers employed.

Accelerators which are sometimes employed in the aqueous polymerization systems comprise the water soluble variable valence metal salts of sulfates, nitrates, phosphates and chlorides such as cuprous sulfate, ferrous sulfate and silver nitrate. Such accelerators are generally employed in an amount between about 0.01 and about 1.0 part by 100 parts of total monomers employed and preferably in an amount between about 0.05 and 0.5 part by weight. When an activator such as sodium metabisulfite, and an accelerator such as ferrous sulfate are employed, the catalyst system is referred to as a redox system. The above-mentioned organic peroxides are preferably employed in such a redox system.

The emulsifiers which are employed in the preferred aqueous polymerization systems comprise metal salts such as the potassium or sodium salt derivatives derived from saturated aliphatic acids, the optimum chain length of the acid being between about 14 and about 20 carbon atoms, and the various salt derivatives of fluorochloroalkanoic acids and fluoroalkanoic acids having between about 6 and about 20 carbon atoms per molecule. Typical examples of the derivatives of aliphatic acids which may be employed are potassium stearate and potassium oleate, and mixtures thereof.

The derivatives of fluoroalkanoic acids which are used to advantage include the metal salts of perfluoro acids such as potassium perfluorooctanoate and the derivatives of the polyfluoroalkanoic acids disclosed in U.S. Patent No. 2,559,752 as being effective dispersing agents in polymerization reactions. The preferred fluorochlorocarboxylic acid derivatives which also are useful as emulsifiers are those of the perfluorochloro acids obtained upon hydrolysis of trifluorochloroethylene-sulfuryl chloride telomers in fuming sulfuric acid. Such perfluorochloro acids have the successively recurring unit, —CF$_2$—CFCl— a chlorine-containing end group, and an even number of carbon atoms which is preferably between about 6 and about 14 carbon atoms. Typical examples of such emulsifiers are the potassium, sodium and ammonium salts of 3,5,7,8 - tetrachloroundecafluorooctanoic acid and of 3,5,6-trichlorooctafluorohexanoic acid. The emulsifier is generally employed in a quantity between about 0.2 and 10 parts by weight per 100 parts of total monomer and preferably between about 0.5 and about 5.0 parts by weight are used.

Buffering agents are advantageously used to maintain appropriate pH conditions during the polymerization reaction. Typical examples of suitable buffers are disodium hydrogen phosphate, and sodium metaborate. The buffers are usually employed in an amount between about 1.0 and about 4.0 parts by weight per 100 parts water, or enough to maintain the pH of the system at a value which is preferably between 5 and 9.

As indicated above, the polymerization process of the present invention also may be carried out at a temperature between about —15° C. and about 150° C. in a non-aqueous mass or bulk polymerization system comprising a free radical forming promoter such as the organic peroxy compounds and azo compounds, or an ionic promoter. The organic peroxides which may be used include the aliphatic and aromatic peroxy compounds as well as the fluorine and chlorine substituted organic peroxides. Exemplary of suitable aliphatic peroxides are diacetyl peroxide, lauroyl peroxide, tertiary-butyl peroxide, caprylyl peroxide, trichloroacetyl peroxide, perfluoropropionyl peroxide, 3-carboxy propionyl peroxide, 3,4-dibromobutyryl peroxide, trifluoroacetyl peroxide, difluoroacetyl peroxide and perfluorononanoyl peroxide. Exemplary of suitable aromatic peroxides are benzoyl peroxide, p-nitrobenzoyl peroxide and 2,4-dichlorobenzoyl peroxide. Exemplary of the azo compounds which may be employed are 2,2'-azo-bis-isobutyronitrile, 2,2'-azobis - 2,4 - dimethylvaleronitrile and 2,2' - azo - bis - 2,3,3-trimethylbutyronitrile. Exemplary of suitable ionic initiators which may be employed in the mass type polymerization system are Friedel-Crafts type catalysts such as boron trifluoride, aluminum trichloride, stannic chloride, ferric chloride, titanium tetrachloride and phosphorus pentachloride; and mineral acids such as sulfuric acid and phosphoric acid.

The preferred temperature which is employed to effect the polymerization reaction of the present invention in an aqueous medium is between about 15° C. and about 75° C. The preferred temperature employed to effect polymerization in a mass or bulk system is dependent upon the type catalyst employed. For example, the halogenated peroxides such as trichloroacetyl peroxide, perfluoropropionyl peroxide, and 2,4-dichlorobenzoyl peroxide and azo compounds are preferably employed at a temperature between about —15° C. and about 65° C. The ionic promoters and the non-halogenated peroxy compounds such as acetyl peroxide, benzoyl peroxide and tertiary-butyl peroxide are preferably employed at a temperature between about 30° C. and about 150° C.

The polymerization reactions described herein to produce polymeric materials comprising 2-trifluoromethyl-butadiene and a fluoromonoolefin are conveniently carried out under autogenous pressure. In general these pressures do not rise above approximately 160 atmospheres. Superimposed pressures up to about 500 atmospheres or higher also may be employed and are attained by charging the polymerization zone with an inert gas such as nitrogen to obtain the desired elevated pressure. Generally speaking, the polymerization reactions of the present invention are conducted for a reaction time which may vary between about 1 to about 100 hours, but usually good yields of polymer product are obtained in less than about 72 hours. The polymerization reaction can be carried out in a batchwise or continuous manner as desired.

The polymerization process of the present invention also may be effected in the presence of an organic solvent instead of or in addition to water. Examples of solvents of this kind are hydrocarbon solvents such as hexane, isooctane, cyclohexane, and methyl cyclohexane; aromatic solvents such as benzene, toluene and xylenes; the oxygenated solvents such as methanol, ethanol, isopropanol, tertiary-butanol, dioxane, tetrahydrofuran and tertiary-amyl alcohol; and preferably fluorochlorocarbon solvents such as trichlorofluoromethane (Freon-11) and sulfuryl chloride telomers of trifluorochloro ethylene having the recurring unit, —$CF_2$—$CFCl$—, chlorine end groups and an even number of carbon atoms which is preferably between 4 and 14.

Plasticizers and finely divided solids which serve as fillers can be included in the polymerization mixture and the polymerization can be carried out in their presence. Examples of suitable fillers include pigments such as titanium oxide, metals such as copper and iron powder and other finely divided materials such as mica and asbestos. These and similar materials can also be added to the preformed polymers.

The 2-trifluoromethyl-butadiene polymers of the present invention are particularly suitable and useful as durable, flexible coatings for application to metal or fabric surfaces. The copolymers are dissolved in a suitable solvent and applied to the surfaces by spraying, brushing or other such conventional coating techniques. Particularly useful solvents for this purpose comprise the relatively low molecular weight and volatile aliphatic carboxylic acid esters such as methyl acetate, ethyl acetate, and butyl acetate; and ketones such as methyl ethyl ketone. In this respect it should be noted that it is often desirable to reduce the molecular weight of the finished polymers of the present invention in order to obtain greater solubility in other volatile organic solvents and to obtain increased softness in their rubbery characteristics which may sometimes be desirable. The polymerization reactions which are carried out in the presence of the polymerization promoters of the present invention normally tend to form very high molecular weight polymeric products, that is, polymers having a molecular weight of at least 50,000. A reduction of the strength of the recipe or polymerization promoter merely slows the rate of reaction without appreciably effecting the molecular weight of the finished copolymer. It has been found, however, that the addition of various polymerization modifiers appreciably reduces the molecular weight of the copolymer products and increases their solubility without effecting unduly the overall yield. Suitable polymerization modifiers include chloroform, 1,1,2-trichlorotrifluoroethane (Freon 113), carbon tetrachloride, bromotrichloromethane, trichloroacetyl chloride and dodecylmercaptan. These polymerization modifiers are preferably added in amounts between about 1 and about 10 parts by weight per 100 parts of total monomers charged to the polymerization zone.

The following examples are offered as a better understanding of the present invention and are not to be construed as unnecessarily limiting thereto.

Example 1

This example illustrates the copolymerization of 2-trifluoromethyl-butadiene with vinylidene fluoride.

A heavy walled glass polymerization tube was flushed with nitrogen and was then charged with 2 ml. of a 2 percent by weight aqueous solution of sodium metabisulfite. The stoppered tube was then placed in a liquid nitrogen freezing bath. After the contents of the tube were frozen solid, the tube was charged with 5 ml. of a 10 percent by weight aqueous solution of potassium stearate, having a pH adjusted to about 11 by the addition thereto of an aqueous potassium hydroxide solution. The contents of the tube were refrozen and the tube was then charged with 3 ml. of a 3.5 percent by weight aqueous solution of potassium persulfate. The contents of the tube were then refrozen and the tube was connected to a gas transfer system and evacuated at liquid nitrogen temperature. Thereafter the tube was charged with 3.47 grams of 2-trifluoromethyl-1,3-butadiene and 1.76 grams of vinylidene fluoride to make up a total monomer charge containing 50 mol percent of each monomer. The polymerization tube was then sealed and rotated end-over-end in a temperature regulated bath at 25° C. The polymerization reaction was conducted under autogenous pressure at 25° C. for a period of 24 hours. The polymer latex thereby obtained was coagulated by freezing it at liquid nitrogen temperature. The coagulated product was collected, washed with hot water to remove residual salts and dried to constant weight in vacuo at 35° C. A rubbery material was obtained which, upon analysis for fluorine content, was found to comprise approximately 61 mol percent of combined 2-trifluoromethyl-butadiene, the remaining major constituent being vinylidene fluoride monomer units. The polymer product of this example was obtained in an amount corresponding to a 39 percent conversion.

A sample of this raw copolymer was compression molded at 120° F. for 10 minutes. After molding the sample remained as a rubbery material. The 2-trifluoromethyl-butadiene copolymer of this example possesses good physical and mechanical properties and retains its flexibility at temperatures as low as −32.5° C. and lower. It is particularly suited for the manufacture of end products such as resilient gaskets which are to be used at relatively low temperatures where retention of rubbery properties is a prime requisite.

Example 2

This example illustrates the copolymerization of 2-trifluoromethyl-butadiene with tetrafluoroethylene.

Employing the procedure set forth in Example 1 and the same aqueous emulsion polymerization system, the tube was charged with 2.75 grams of 2-trifluoromethyl-1,3-butadiene and 2.25 grams of tetrafluoroethylene, to make up a total monomer charge containing 50 mol percent of each of the monomers. The polymerization reaction was carried out under autogenous pressure at a temperature of 25° C. for a period of 24 hours. The resultant polymer latex was worked up in accordance with the same procedure set forth in Example 1. A tough, snappy rubber was obtained which, upon analysis for fluorine content, was found to comprise approximately 67 mol percent of combined 2-trifluoromethylbutadiene, the remaining constituent being combined tetrafluoroethylene monomer units. The copolymer was obtained in an amount corresponding to a 22 percent conversion.

A sample of this raw copolymer was compression molded at 250° F. for 10 minutes. After molding, the sample remained as a tough, snappy rubber having a torsional modulus of 12.6 pounds per square inch. The raw copolymer milled easily at 25° C. in a conventional rubbery mill and remained as a tough rubber. The raw copolymer retains its flexibility at temperatures as low as −26° C. and lower without marked evidence of embrittlement.

Example 3

This example illustrates the copolymerization of 2-trifluoromethyl-butadiene with trifluoroethylene.

Employing the procedure set forth in Example 1 and the same aqueous emulsion polymerization system, the tube was charged with 3 grams of 2-trifluoromethyl-1,3-butadiene and 2.0 grams of trifluoroethylene corresponding to a total monomer charge containing 50 mol percent of each monomer. The polymerization was carried out under autogenous conditions of pressure at a temperature of 25° C. for 23 hours. The resultant polymer latex was worked up in accordance with the same procedure set forth in Example 1. A snappy, rubbery polymeric product was obtained in about a 16 percent conversion. This copolymer product has good low temperature flexibility and does not show any marked embrittlement when cooled to −10° C.

*Example 4*

This example illustrates the copolymerization of 2-trifluoromethyl-butadiene with hexafluoropropene.

A heavy walled glass polymerization tube was flushed with nitrogen and was then charged with 7 ml. of water containing 1.0 percent by weight of the potassium salt of the $C_8$-telomer acid derived from the $C_8$-sulfuryl chloride telomer of trifluorochloroethylene, namely, potassium 3,5,7,8-tetrachloroperfluorooctanoate. The pH of this solution had been adjusted to 9.5 by the addition thereto of an aqueous potassium hydroxide solution. The potassium $C_8$-telomerate functions as an emulsifier. The stoppered tube was then placed in a solid carbon dioxide-trichloroethylene freezing bath. After the contents of the tube were frozen solid, the tube was charged with 3 ml. of a 3 percent by weight aqueous solution of potassium persulfate. In a separate experiment it was found that the final pH is about 7 when the aforesaid ingredients, in the amounts stated, are mixed without freezing. The contents of the tube were then refrozen and the tube was charged with 2.24 grams of 2-trifluoromethyl-1,3-butadiene and 2.76 grams of hexafluoropropene to make up a total monomer charge containing 50 mol percent of each monomer. The polymerization tube was then sealed and rotated end-over-end in a temperature regulated bath at 50° C. The polymerization was conducted under autogenous pressure at 50° C. for a period of 48 hours. The polymer latex thus obtained was coagulated by freezing it at liquid nitrogen temperature. The coagulated product was collected, washed with hot water to remove residual salts and dried to constant weight in vacuo at 35° C. A snappy, rubbery product was obtained in about a 34 percent conversion.

This elastomeric polymeric product of 2-trifluoromethyl-butadiene and hexafluoropropene exhibited good low temperature flexibility, i.e. when cooled to a temperature of −29.8° C., it was still a flexible, rubbery material.

*Example 5*

This example illustrates the copolymerization of 2-trifluoromethyl-butadiene with 1,1,1-trifluoro-3-trifluoromethyl-butene-2.

Employing the procedure set forth in Example 4 and the same aqueous emulsion polymerization system, the tube was charged with 3.49 grams of 2-trifluoromethyl-1,3-butadiene and 1.51 grams of 1,1,1-trifluoro-3-trifluoromethyl-butene-2 to make up a total monomer charge containing 75 mol percent of 2-trifluoromethyl-butadiene and 25 mol percent of the fluorobutene. The polymerization reaction was carried out under autogenous pressure at a temperature of 50° C. for a period of 22 hours. The resultant polymer product was worked up in accordance with the same procedure set forth in Example 4. A tough elastomer was obtained which, upon analysis for fluorine content, was found to comprise approximately 90 mol percent of combined 2-trifluoromethyl-butadiene and about 10 mol percent of combined 1,1,1-trifluoro-3-trifluoromethyl-butene-2. The copolymer was obtained in an amount corresponding to a 54 percent conversion.

The raw copolymer of this example was compression molded at 150° F. for 10 minutes. After molding, the sample remained as a rubbery material having good physical and mechanical properties and low temperature flexibility. It retained its flexibility when cooled to a temperature of −28.8° C. and lower. This copolymer of 2-trifluoromethyl-butadiene is particularly useful for the fabrication of O-rings and pump diaphragms and seals.

*Example 6*

This example further illustrates the copolymerization of 2-trifluoromethyl-butadiene with 1,1,1-trifluoro-3-trifluoro-methyl-butene-2.

A heavy walled glass polymerization tube was flushed with nitrogen and was then charged with 3.5 ml. of a 1.0 percent aqueous solution of potassium perfluorooctanoate, the pH of this solution having been adjusted to 9.5 by the addition thereto of an aqueous potassium hydroxide solution. The contents of the tube were then frozen solid and the tube was charged with 1.5 ml. of an aqueous solution containing 3 percent by weight of potassium persulfate. The pH of this polymerization medium is about 7. The contents of the tube were then refrozen and the tube was connected to a gas-transfer system and evacuated at liquid nitrogen temperature. Thereafter the tube was charged with 2.18 grams of 2-trifluoromethyl-1,3-butadiene and 2.82 grams of 1,1,1-trifluoro-3-trifluoromethyl-butene-2 to make up a total monomer charge containing 50 mol percent of each of the monomers. The polymerization tube was then sealed and rotated end-over-end in a constant temperature bath set at 50° C. The polymerization reaction was conducted under autogenous conditions of pressure at 50° C. for a period of 22 hours. The polymer latex and product were worked up using the same procedure set forth in the above examples. A tough, elastomeric product was obtained which, upon analysis for fluorine content, was found to comprise approximately 85 mol percent of combined 2-trifluoromethyl-butadiene and 15 mol percent of combined 1,1,1-trifluoro-3-trifluoromethyl-butene-2.

The raw copolymer of this example was compression molded at 150° F. for 10 minutes. After molding, the sample remained as a rubbery material having good physical and mechanical properties and low temperature flexibility. It retained its flexibility when cooled to a temperature of −29.9° C. without evidence of embrittlement.

*Example 7*

This example illustrates the copolymerization of 2-trifluoromethyl-butadiene with 3,3,3-trifluoropropene.

Employing the procedure set forth in Example 1 and the same aqueous emulsion polymerization system, the tube was charged with a monomer mixture containing 85 mol percent of 2-trifluoromethyl-butadiene and 15 mol percent of 3,3,3-trifluoropropene. The polymerization reaction was carried out under autogenous conditions of pressure at a temperature of 40° C. for a period of 24 hours. The resultant polymer latex and product were worked up following the same procedure set forth in the above examples. A somewhat sticky, rubbery material was obtained in about an 85 percent conversion and contains approximately 80 mol percent of 2-trifluoromethyl-butadiene, the remaining major constituent being combined monomer units of 3,3,3-trifluoropropene. This copolymer retains its flexibility and rubbery characteristics at temperatures well below −10° C.

A novel copolymer having good physical and mechanical properties as well as good low temperature characteristics was similarly obtained by copolymerizing a monomer mixture containing 75 mol percent of 2-trifluoromethyl-butadiene and 25 mol percent of 3,3,3-trifluoropropene in the same aqueous emulsion polymerization system used in accordance with Example 1 above and by conducting the polymerization at about 40° C. for about 24 hours under autogenous pressure.

*Example 8*

This example illustrates the copolymerization of 2-trifluoromethyl-butadiene with 1,1,3,3,3-pentafluoropropene.

Employing the same procedure and aqueous emulsion polymerization catalyst system of Example 1, a polymerization tube was charged with a monomer mixture containing 50 mol percent of each of the monomers, 2-trifluoromethyl-butadiene and 1,1,3,3,3-pentafluoropropane. The polymerization reaction was carried out under autogenous pressure at 40° C. for a period of 24 hours. Following the same procedure set forth in the above examples, the polymer latex was worked up to yield a rubbery product in about a 41 percent conversion. This raw copolymer when milled in a conventional rubber mill at 25° C. forms a snappy, clear rubbery sheet. It retains its rubbery characteristics when cooled to temperatures well below —10° C.

A new and useful elastomer was similarly obtained by copolymerizing a monomer mixture containing 75 mol percent of 2-trifluoromethyl-butadiene and 25 mol percent of 1,1,3,3,3-pentafluoropropene in the same aqueous emulsion polymerization system of Example 1, and by conducting the polymerization reaction at 40° C. for 24 hours under autogenous pressure.

Example 9

This example illustrates the copolymerization of 2-trifluoromethyl-butadiene with certain chlorine and fluorine substituted monoolefins.

(A) *Copolymerization of 2-trifluoromethyl-butadiene with trifluorochloroethylene.*—Employing the procedure set forth in Example 1 and the same aqueous emulsion polymerization system, the tube was charged with 2.56 grams of 2-trifluoromethyl-1,3-butadiene and 2.44 grams of trifluorochloroethylene to make up a total monomer charge containing 50 mol percent of each of the monomers. The polymerization reaction was carried out under autogenous conditions of pressure at a temperature of 50° C. for a period of 20 hours. The resultant polymer latex and product were worked up following the same procedure set forth in the above examples. A rubbery product was obtained containing about 85 mol percent of combined 2-trifluoromethyl-butadiene and about 15 mol percent of combined trifluorochloroethylene. Although this polymeric product of 2-trifluoromethyl-butadiene was rubbery at room temperature, it showed a marked degree of embrittlement when cooled to 0° C. which embrittlement was not observed in the above copolymers derived by copolymerizing 2-trifluoromethyl-butadiene with ethylenically mono-unsaturated hydrocarbons in which one or more hydrogen atoms is substituted only with fluorine.

(B) *Copolymerization of 2-trifluoromethyl-butadiene with 1,1-chlorofluoroethylene.*—Employing the same procedure and aqueous emulsion polymerization system of Example 6, a polymerization tube was charged with 3 grams of 2-trifluoromethyl-1,3-butadiene and 2 grams of 1,1-chlorofluoroethylene to make up a total monomer charge containing 50 mol percent of each of the monomers. The polymerization reaction was carried out under autogenous conditions of pressure at 50° C. for a period of 24 hours. Following the procedure set forth in the above examples, the polymer latex was worked up to yield a rubbery product in about a 52 percent conversion. This product was found to contain about 97 mol percent of combined 2-trifluoromethyl-butadiene and about 3 mol percent of combined 1,1-chlorofluoroethylene. The physical and mechanical properties of this copolymer do not show any significant improvement or difference as compared to those of the homopolymer of 2-trifluoromethyl-1,3-butadiene.

(C) *Copolymerization of 2-trifluoromethyl-butadiene with 2,3-dichlorohexafluorobutene-2.*—A polymerization tube was charged with the same aqueous emulsion polymerization system used in Example 1 above followed by the addition thereto of 3.38 grams of 2-trifluoromethyl-1,3-butadiene and 1.62 grams of 2,3-dichlorohexafluorobutene-2 making up a monomer charge containing 80 mol percent of the diene and 20 mol percent of the butene. The reaction was carried out under autogenous pressure at 50° C. for 25 hours. A rubbery product was obtained which was found to consist essentially of monomer units of 2-trifluoromethyl-butadiene, essentially no copolymerization of the 2,3-dichlorohexafluorobutene-2 having occurred.

(D) *Copolymerization of 2-trifluoromethyl-butadiene with 2 chloropentafluoropropene.*—A polymerization tube was charged with the same aqueous emulsion polymerization system employed in Example 6 above and was thereafter charged with 2.52 grams of 2-trifluoromethyl-1,3-butadiene and 2.48 grams of 2-chloropentafluoropropene or a monomer mixture containing 89 mol percent of the diene and 11 mol percent of the propene. The polymerization reaction was carried out under autogenous pressure at 50° C. for 25 hours. A rubbery product was obtained in about a 55 percent conversion and, upon analysis for fluorine and chlorine content, was found to contain about 98 mol percent of combined 2-trifluoromethyl-butadiene and only about 2 percent of combined 2-chloropentafluoropropene. The incorporation of about 2 mol percent of 2-chloropentafluoropropene into the polymer of 2-trifluoromethyl-butadiene does not appreciably improve the properties of poly-2-trifluoromethyl-butadiene homopolymer.

(E) *Copolymerization of 2-trifluoromethyl-butadiene with 1-chloro-2,2-difluoroethylene.*—A polymerization tube was charged with the same aqueous polymerization system employed in Example 6 and was thereafter charged with a monomer mixture containing 80 mol percent of 2-trifluoromethyl-butadiene and 20 mol percent of 1-chloro-2,2-difluoroethylene. The polymerization reaction was carried out under autogenous pressure at 50° C. for 66 hours. A rubbery product was obtained in about a 72 percent conversion but, upon analysis for fluorine and chlorine content, was found to contain only 1.5 mol percent of combined 1-chloro-2,2-difluoroethylene, the product consisting essentially of 2-trifluoromethyl-butadiene. This product does not exhibit any significant difference in properties as compared to the homopolymer of 2-trifluoromethylbutadiene.

Thus it is seen that, generally speaking, the copolymerization of 2-trifluoromethyl-butadiene with ethylenically mono-unsaturated hydrocarbons having a combination of fluorine and chlorine substituents leads to the production of copolymers which either do not have as good low temperature properties as the polymers produced by copolymerizing 2-trifluoromethyl-butadiene with an ethylenically unsaturated hydrocarbon in which one or more hydrogen atoms is substituted only with fluorine atoms, or the products contain so little of the chlorine substituted comonomer, i.e. 3 mol percent or less, that no appreciable improvement is obtained in the properties of the polymer of 2-trifluoromethyl-butadiene.

The copolymers of 2-trifluoromethyl-butadiene of the present invention can be molded by compression extrusion and transfer molding techniques at temperatures which are preferably between about 150° F. and about 350° F. As indicated above, they are used in a preferred form for the manufacture of articles such as resilient gaskets, O-rings, pump diaphragms and seals, and as protective linings which are to be used particularly in lining component parts of refrigeration systems. Suitable vulcanizing agents such as those employed in the conventional type sulfur cure may be included in these formulations in which case heat is usually applied to bring about vulcanization.

As is apparent, in one aspect, the present invention relates to novel compositions which comprise recurring monomer units of 2-trifluoromethyl-butadiene and a monoolefin in which one or more, and preferably two or more, hydrogen atoms are substituted only with a corresponding number of fluorine substituents. The particularly preferred fluoro-monoolefin comonomers are those having not more than six carbon atoms per molecule and having at least as many fluorine substituents as there are carbon atoms. Thus, for example, of the fluoropropenes which are employed, those containing at least three fluorine substituents per molecule are preferred. Various alterations and modifications of the novel compositions of the present invention and of the process for preparing such compositions may become apparent to those skilled in the art without departing from the scope of the present invention.

We claim:
1. A process which comprises polymerizing a mixture consisting essentially of between about 5 and about 90 mol percent of 2-trifluoromethyl-butadiene and between about 95 and 10 mol percent of a fluorinated monoolefin having a maximum of six carbon atoms and having only fluorine and hydrogen substituents on said carbon atoms, said polymerization being effected at a temperature between about −15° C. and about 150° C. in contact with an initiator selected from the group consisting of free radical forming initiators and ionic initiators.
2. The process of claim 1 in which said fluorinated monoolefin is vinylidene fluoride.
3. The process of claim 1 in which said fluorinated monoolefin is tetrafluoroethylene.
4. The process of claim 1 in which said fluorinated monoolefin is 3,3,3-trifluoropropene.
5. The process of claim 1 in which said fluorinated monoolefin is hexafluoropropene.
6. The process of claim 1 in which said fluorinated monoolefin is 1,1,1-trifluoro-3-trifluoromethyl-butene-2.
7. A rubbery polymer of between about 10 and about 95 mol percent of 2-trifluoromethyl-butadiene and between about 90 and about 5 mol percent of a fluorinated monoolefin having a maximum of six carbon atoms and having only fluorine and hydrogen substituents on said carbon atoms.
8. A rubbery copolymer having low temperature flexibility, elasticity and resilience which consists of between about 40 and about 90 mol percent of combined 2-trifluoromethyl-butadiene and between about 60 and about 10 mol percent of a fluorinated monoolefin having a maximum of six carbon atoms and having only fluorine and hydrogen substituents on said carbon atoms, the fluorine atoms per molecule being at least as numerous as the carbon atoms.
9. A rubbery copolymer having low temperature flexibility, elasticity and resilience which consists of between about 40 and about 90 mol percent of 2-trifluoromethyl-butadiene and between about 60 and about 10 mol percent of a fluoroethylene having only fluorine and hydrogen substitutents and having at least two fluorine atoms.
10. The rubbery copolymer of claim 9 in which the fluoroethylene is vinylidene fluoride.
11. The rubbery copolymer of claim 9 in which the fluoroethylene is tetrafluoroethylene.
12. A rubbery copolymer having low temperature flexibility, elasticity and resilience which consists of between about 40 and about 90 mol percent of 2-trifluoromethyl-butadiene and between about 60 and about 10 mol percent of a fluoropropene having only fluorine and hydrogen substituents and having at least three fluorine atoms.
13. The rubbery copolymer of claim 12 in which the fluoropropene is 3,3,3-trifluoropropene.
14. The rubbery copolymer of claim 12 in which the fluoropropene is hexafluoropropene.
15. A rubbery copolymer having low temperature flexibility, elasticity and resilience which consists of between about 40 and about 90 mol percent of 2-trifluoromethyl-butadiene and between about 60 and about 10 mol percent of a fluorobutene having only fluorine and hydrogen substituents and having at least four fluorine atoms.
16. The rubbery copolymer of claim 15 in which the fluorobutene is 1,1,1-trifluoro-3-trifluoromethyl-butene-2.

References Cited in the file of this patent

UNITED STATES PATENTS

| 2,479,367 | Joyce et al. | Aug. 16, 1949 |
| 2,490,753 | Hill et al. | Dec. 6, 1949 |
| 2,549,935 | Sauer | Apr. 24, 1951 |
| 2,750,431 | Tarrant et al. | June 12, 1956 |